United States Patent [19]

van der Lely et al.

[11] Patent Number: 5,004,163

[45] Date of Patent: Apr. 2, 1991

[54] DEVICES FOR SPREADING GRANULAR AND/OR POWDERY MATERIAL

[75] Inventors: Ary van der Lely, Maasland; Cornelis J. G. Bom, Rozenburg, both of Netherlands

[73] Assignee: C. van der Lely N.V., Maasland, Netherlands

[21] Appl. No.: 89,755

[22] Filed: Oct. 30, 1979

[30] Foreign Application Priority Data

Oct. 31, 1978 [NL] Netherlands ................... 7810805

[51] Int. Cl.⁵ ......................................... A01C 17/00
[52] U.S. Cl. ................................. 239/661; 239/682; 239/684
[58] Field of Search ............... 239/661, 670, 681, 682, 239/683, 684, 687; 222/317, 555

[56] References Cited

U.S. PATENT DOCUMENTS

| 483,623 | 10/1892 | Thoren .................................. 239/682 |
| 2,162,689 | 6/1939 | Mayfield . |
| 2,537,913 | 1/1951 | Rimple ................................... 239/682 |
| 2,638,351 | 5/1953 | Stornetta et al. .................... 239/682 |
| 3,133,737 | 5/1964 | Kaller . |
| 3,313,549 | 4/1967 | Bell ................................. 239/682 X |
| 3,652,019 | 3/1972 | van der Lely ....................... 239/682 |
| 3,667,551 | 6/1972 | van der Lely et al. . |
| 3,767,126 | 10/1973 | van der Lely .................. 239/684 X |
| 3,899,138 | 8/1975 | van der Lely et al. ............. 239/661 |
| 4,205,793 | 6/1980 | van der Lely ...................... 239/682 |

FOREIGN PATENT DOCUMENTS

| 496523 | 7/1977 | Australia . |
| 251940 | 1/1967 | Austria . |
| 258628 | 12/1967 | Austria . |
| 680356 | 4/1966 | Belgium . |
| 674228 | 11/1963 | Canada . |
| 729496 | 3/1966 | Canada . |
| 781829 | 4/1968 | Canada . |
| 802764 | 12/1968 | Canada . |
| 896411 | 3/1972 | Canada . |
| 901037 | 5/1972 | Canada . |
| 1148792 | 5/1963 | Fed. Rep. of Germany . |
| 1965463 | 5/1967 | Fed. Rep. of Germany . |
| 1966951 | 8/1967 | Fed. Rep. of Germany . |
| 1988403 | 6/1968 | Fed. Rep. of Germany . |
| 1990601 | 8/1968 | Fed. Rep. of Germany . |
| 1992777 | 8/1968 | Fed. Rep. of Germany . |
| 1993246 | 9/1968 | Fed. Rep. of Germany . |
| 1995258 | 10/1968 | Fed. Rep. of Germany . |
| 1457772 | 1/1970 | Fed. Rep. of Germany . |

(List continued on next page.)

OTHER PUBLICATIONS

Lely Industries NV Brochure, Centreliner Fertilizer Distributor (Holland).
Prospect Audureau, Duo Jet Distributeur . . . Plateau.
Prospect Amazone, Centrifugal Strever.
Prospect Amazone, Zentrifugalstreuer Amazone mit Staubschofz.
Landmaschinen Rundschau, 1970, No. 2, p. 32.

*Primary Examiner*—Andres Kashnikow
*Attorney, Agent, or Firm*—Penrose L. Albright

[57] ABSTRACT

A device for spreading granular and/or powdery material comprising a hopper for material to be supported and at least two distributing members rotated in opposite directions about vertical rotary axes, material feeding means provided between the hopper and distributing members for feeding material from the hopper to the distributing members so that each of the two distributing members receives the material eccentrically with respect to its rotary axis; the distributing members having such shape and being drivable in a manner, and the feeding means being constructed and disposed whereby in operation material is supplied to the distributing members so that each spreads material across a sector which substantially coincides with the sector across which the other distributing member spreads material. With such a device the material is advantageously spread uniformly and different materials may be spread in the same manner without the need for readjusting various members of the device.

106 Claims, 6 Drawing Sheets

FOREIGN PATENT DOCUMENTS

| | | |
|---|---|---|
| 1945077 | 3/1970 | Fed. Rep. of Germany . |
| 1457870 | 6/1970 | Fed. Rep. of Germany . |
| 1757446 | 4/1971 | Fed. Rep. of Germany . |
| 7115099 | 4/1971 | Fed. Rep. of Germany . |
| 2011894 | 4/1972 | Fed. Rep. of Germany . |
| 2215155 | 10/1972 | Fed. Rep. of Germany . |
| 2548113 | 10/1975 | Fed. Rep. of Germany . |
| 2609608 | 9/1977 | Fed. Rep. of Germany . |
| 2614717 | 10/1977 | Fed. Rep. of Germany . |
| 2752840 | 6/1978 | Fed. Rep. of Germany . |
| 2811130 | 9/1978 | Fed. Rep. of Germany . |
| 1945076 | 12/1978 | Fed. Rep. of Germany . |
| 2818227 | 11/1979 | Fed. Rep. of Germany ...... 239/682 |
| 2917843 | 11/1979 | Fed. Rep. of Germany . |
| 2943721 | 5/1980 | Fed. Rep. of Germany . |
| 472464 | 12/1914 | France . |
| 1269267 | 7/1961 | France . |
| 1440385 | 4/1966 | France . |
| 1523961 | 5/1968 | France . |
| 2008688 | 1/1970 | France ................................ 239/681 |
| 2028506 | 10/1970 | France . |
| 2033368 | 12/1970 | France . |
| 2374836 | 11/1976 | France . |
| 6407872 | 1/1965 | Netherlands . |
| 6508898 | 1/1966 | Netherlands . |
| 6502651 | 9/1966 | Netherlands . |
| 6610697 | 1/1968 | Netherlands . |
| 6717660 | 7/1969 | Netherlands . |
| 6812820 | 3/1970 | Netherlands . |
| 6902712 | 8/1970 | Netherlands . |

DEVICES FOR SPREADING GRANULAR AND/OR POWDERY MATERIAL

This invention relates to devices for dispensing granular and/or powdery material.

According to the present invention there is provided a device for spreading granular or powdery material or both comprising a hopper for the material to be spread and at least two distributing members drivable in opposite senses about upwardly extending rotary axes, feeding means being provided between the hopper and the distributing members for feeding material from the hopper to the distributing members so that each of the two distributing members receives the material eccentrically with respect to the rotary axis; the distributing members having such a shape and being drivable in such a manner, and the feeding means being constructed and disposed such that in operation the material is supplied to the distributing members in a manner such that each of the distributing members spreads the material across a sector about its rotary axis which substantially coincides with the sector across which the other distributing member spreads the material. With such a device the material can be advantageously spread in a very regular manner and different kinds of material can invariably be spread in the same manner without the need for readjusting various members of the device.

The distribution of the material is enhanced when a distributing member comprises a conical portion which is located, viewed in plan, beneath outlet ports of the hopper. The material flows through the outlet ports towards the conical portion of the distributing member and via this portion in an advantageous manner towards ejection blades of the distributing member.

Dosing of the material to be dispersed can be advantageously adjusted by providing dosing plates between the hopper and the distributing members, these plates being coupled in common with a setting shaft of a setting mechanism, which setting shaft is rotatable from a driver's seat on the device or from a vehicle moving the device.

An advantageous form of device is obtained if the hopper and the distributing members are supported by a frame comprising a vertically extending framework located on one side of the device and having fastened to it supporting arms and a supporting beam for supporting the hopper and the distributing members.

For a better understanding of the invention and to show how the same may be carried into effect, reference will now be made, by way of example to the accompanying drawings in which:

DESCRIPTION OF THE PREFERRED EMBODIMENTS

Figure 1:
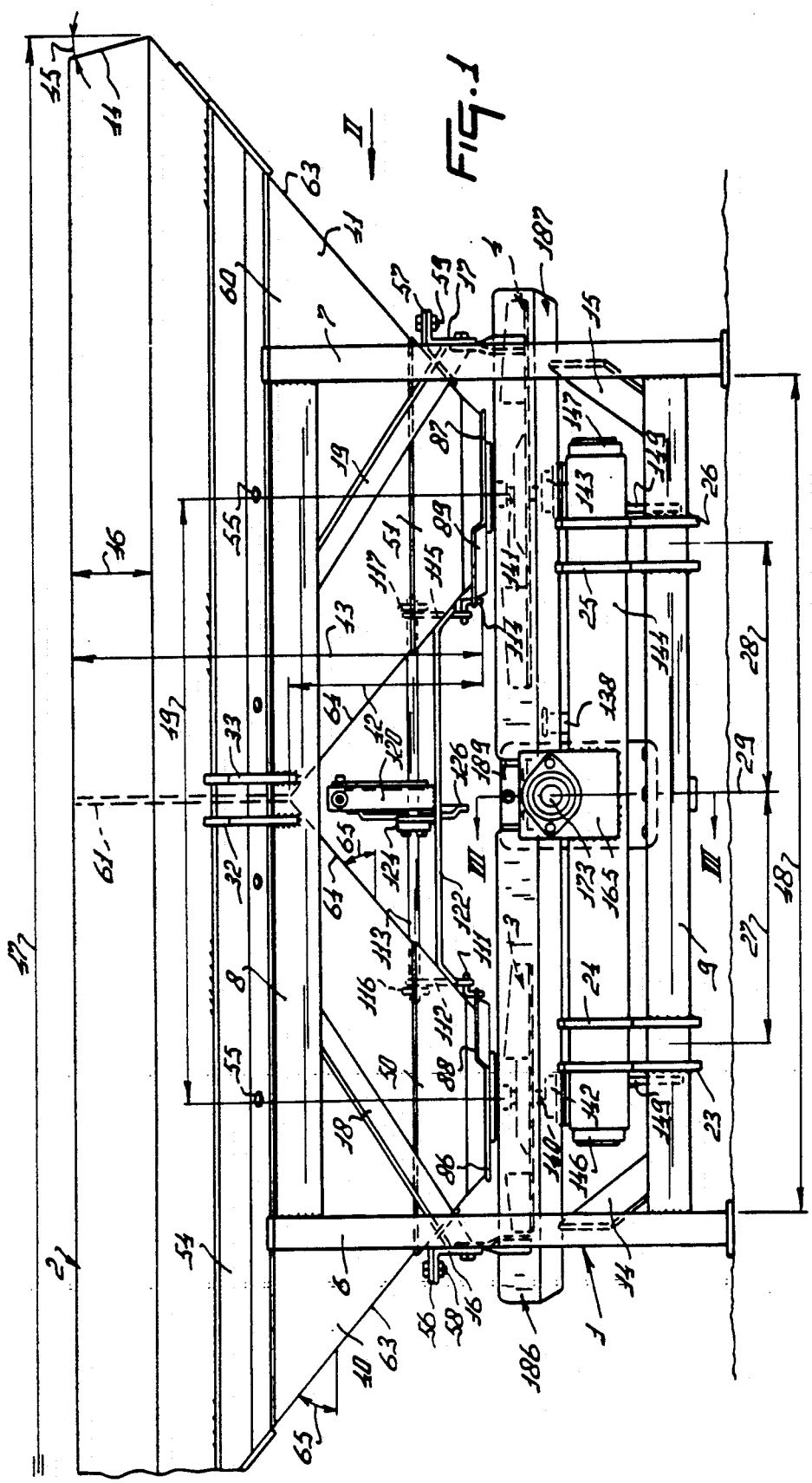
FIG. 1 is a front view of the major part of a device for spreading granular and/or powdery material.

The device illustrated in FIGS. 1 to 9 is a dispenser for spreading granular and/or powdery material or both, particularly fertilizer or seeds, and is adapted for attachment to the lifting device of a tractor. The device has a frame 1 on which are mounted a hopper 2 and two distributing members 3 and 4 that rotate about upwardly extending rotary axes 72 and 73. The axes 72 and 73 are located in a vertical plane 220 which is at right angles to the intended direction of operative travel of the device over the ground, indicated by arrow 195. The frame includes an upwardly extending, quadrangular framework located at the front of the device and comprising two upwardly extending hollow beams 6 and 7 of rectangular cross-section interconnected at their top ends by a circular-section beam 8 and near their lower ends by a circular-section beam 9. At the level of the beam 9 located at a short distance above the lower ends of the beams 6 and 7 a V-shaped supporting beam 10 is fastened to the beams 6 and 7. The limbs 11 and 12 of the beam 10 converge away from the beams 6 and 7 and are interconnected at the rear of the device by a curved part 13. The curved part 13 is provided with upper and lower lugs 35 and 36 having registering apertures 37. The connection of the beam 10 with the beams 6 and 7 is reinforced by strip struts 14 and 15.

Approximately midway of their height the beams 6 and 7 have fastened to them supporting arms 16 and 17 of angular cross-section. The arms 16 and 17 and the beam 10 extend parallel to a plane normal to the framework comprising the beams 6 to 9. The connection of the beams 16 and 17 with the beams 6 and 7 is reinforced by strip struts 18 and 19. The beam 8 is provided with a supporting strip 20, the connection of the strip 20 with the beam 18 having reinforced by a plurality of strut plates 21. The strip 20 has a length equal to that of the beam 8 and therefore, like the beam 8, it is located, as shown in the front view of FIG. 1, between the beams 6 and 7. The strip-shaped beam 20 is at an angle 22 of about 35° to the plane normal to the framework of beams 6 to 9.

The beam 9 has fastened to it two pairs of upwardly and forwardly inclined plates 23, 24 and 25, 26, the plates 23, 24 or 25, 26 of each pair being fastened as is shown in FIG. 1, at a short distance from one another to the beam 9, and each pair being at a distance 27 or 28 from the median plane 29 of the device. Each of the plates 23 to 26 has two apertures 30 and 31, the apertures 30 and the apertures 31 respectively of the plates registering with one another. Midway of beam 8 a pair of plates 32 and 33 is provided, each of these plates having an aperture 34. The apertures 34 are in register with one another.

Viewed in plan, the hopper 2 has an elongated rectangular shape with its direction of length parallel to the frame-work of the beams 6 to 9. The hopper 2 has two funnel-shaped outlet parts 40 and 41, located in a front view each on one side or the other of the vertical plane 29 passing through the center of the device. The funnel-shaped outlet parts 40 and 41 have a height 42 which is substantially equal to half the height 43 of the hopper 2. At the top the hopper has rims 44 extending upwards and inwards at an angle 45 of about 15° to the vertical. The rims 44 are of a height 46 which is substantially equal to one-fifth of the height 43 of the hopper. The hopper 2 extends transversely of the vertical plane 29 over a distance 47 which is equal to substantially one and a half times the distance 48 between the beams 6 and 7. It should be noted here that in FIG. 1 one side of the hopper is not shown completely, whereas in FIG. 3 the other side is not shown completely.

The centers of the lower ends of the outlet parts 40 and 41 are spaced apart by a distance 49 which is smaller than the distance 48. The distance 49 is substantially equal to two-thirds of the distance 48. The outlet parts 40 and 41 are rectangular in a horizontal cross-section and the walls of these parts and of the hopper are inclined upwards up to the lower edges of the rims 44. The front and rear walls 60 are at angles 62 of about 55° to the horizontal plane, and the sidewalls 63 and the adjoining funnel walls 64 are at angles 65 of about 40° to the horizontal plane. The hopper is divided into two compartments by a partition 61 which is located above the adjoining funnel walls 64 and is in the median plane 29. The partition 61 may be removable.

The lower ends 50 and 51 of the outlet parts 40 and 41 are formed separately from the remainder of the hopper and they have rectangular upper ends that fit to the lower ends of the remainder of each part 40 or 41, the lower ends 50 and 51 being welded in position. The lower ends 50 and 51 are shaped so that in downward direction they merge into a circular cross-section so that they have bottoms 52 and 53 which are circular, viewed in plan.

Figure 2:
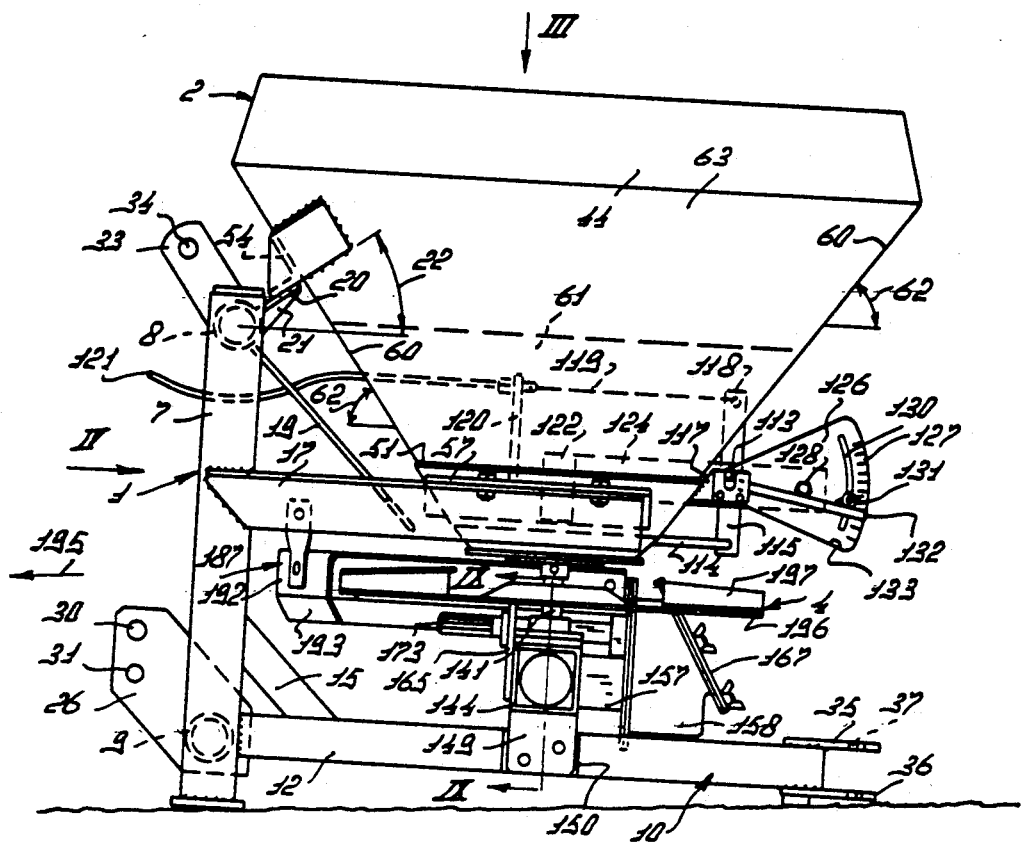
FIG. 2 is a side view of the device of FIG. 1, taken in the direction of arrow II in FIG. 1.

The hopper 2 is provided at the front with an angular cross-section beam 54 which is welded to the front of the hopper. The hopper is fastened with the aid of the beam 54 to the supporting strip 20 of the framework by means of bolts 55. The lower ends 50 and 51 of the funnel-shaped outlet parts 40 and 41 of the hopper are provided with fastening strips 56 and 57 respectively which are fastened by means of bolts 58 and 59 respectively to the supporting arms 16 and 17 of the frame 1, as is illustrated in FIGS. 1 and 2. The strips 56 and 57 preferably have a length substantially equal to the length of the supporting arms 16 and 17 along the lower ends 50 and 51.

Figure 3:
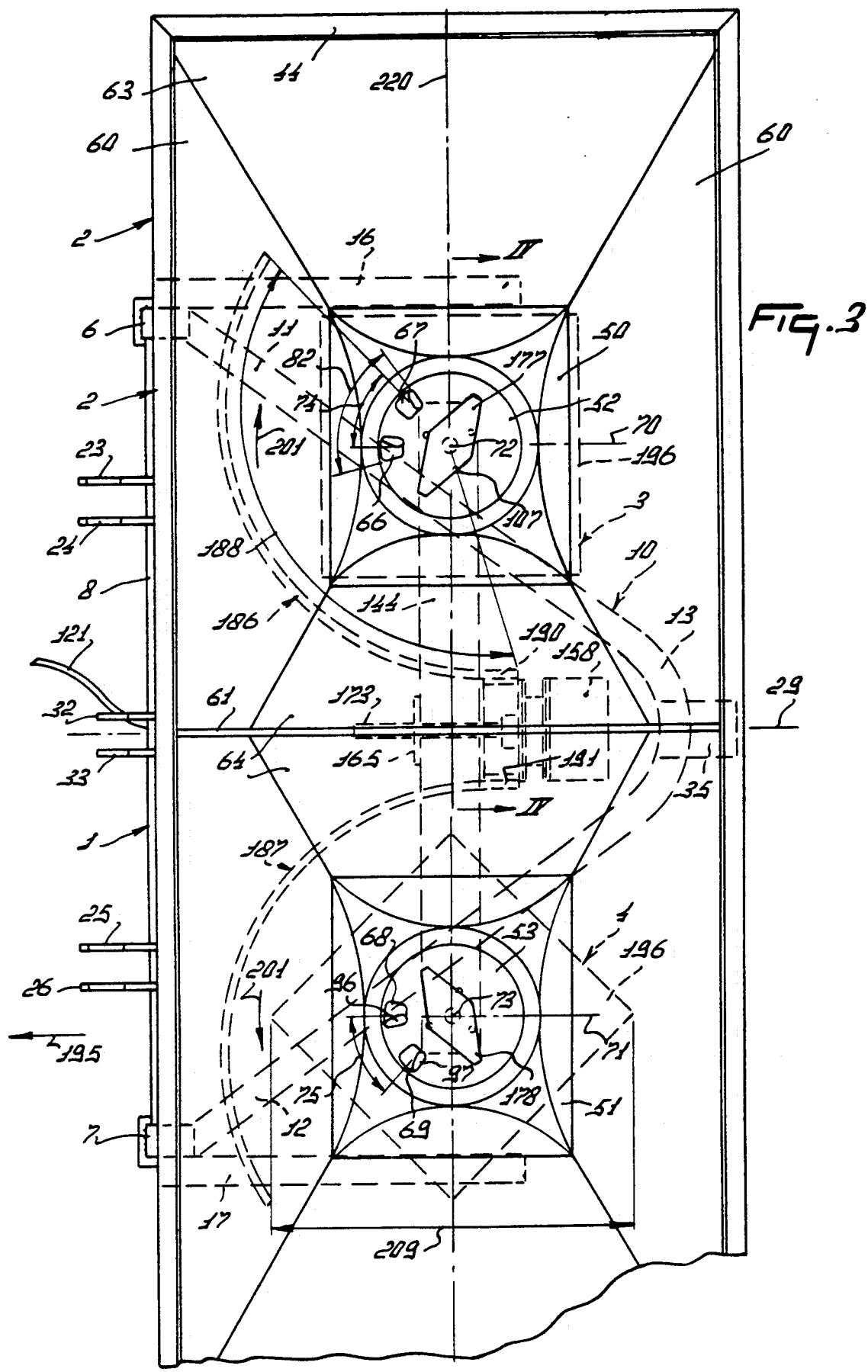
FIG. 3 is a plan view from above in the direction of arrow III of the major part of the device of FIGS. 1 and 2.

Each of the bottoms 52 and 53 has two outlet ports 66 and 67, 68 and 69 respectively (FIG. 3). The outlet ports 66 and 67 in the bottom 52 are mirror images of the apertures 68 and 69 with respect to the vertical plane 29. The apertures 68 and 69 cover an angle 82 of about 70° around the rotary axis 72. The center of the apertures 66 and 68 are located near vertical planes 70 and 71 parallel to the plane 29 and passing through the center lines of the bottoms 52 and 53. These center lines coincide with the rotary axes 72 and 73 of the distributing members 3 and 4 respectively. The center of the port 67 is displaced through an angle 74 of about 45° with respect to the plane 70. Since the ports in the bottom 52 are the mirror images of the ports in the bottom 53, the port 69 is likewise displaced through an angle 75 of about 45° with respect to the plane 71. The ports 67 and 69 are located on the distant sides of the planes 70 and 71. The ports 66 and 69 are identical and, as is shown for the port 67 in FIG. 5, they have straight sides 76 and 77 extending vertically in radial planes from the axis 72. Each port has furthermore two sides 78 and 79 curved concentrically with respect to the axis 72 with the side 78 located nearer the circumference of the bottom 52. The distance between the sides 78 and 79 is equal to about one third to one quarter of the radius 80 of the bottom 52.

Figure 4:
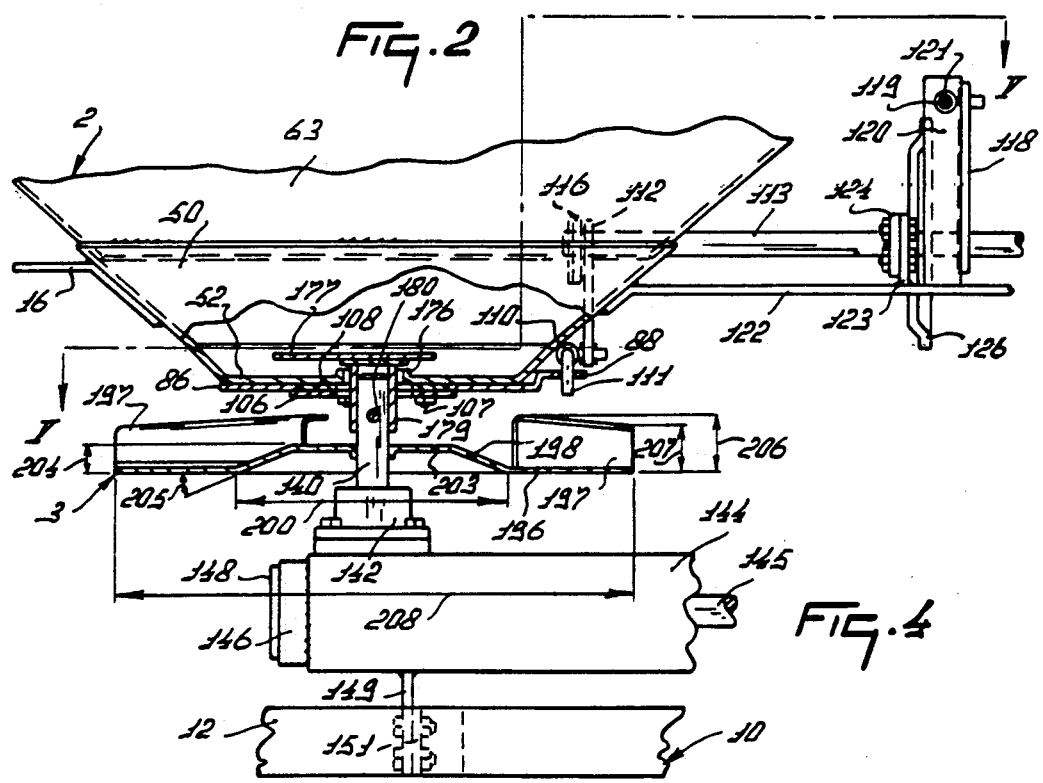
FIG. 4 is a vertical sectional view on a larger scale of part of the device of FIGS. 1 to 3, taken on the on the line IV—IV in FIG. 3.

Beneath each of the bottoms 52 and 53 there is a dosing plate 86 or 87 respectively. The plates 86 and 87 are generally flat and their top faces engage the flat lower faces of the bottoms 52 and 53. The plates 86 and 87 have flaring rims 88 and 89 respectively which are located at a slightly higher level than the remainder of the plates 86 and 87, as shown in FIGS. 1 and 4. The rims 88 and 89, as is shown for the rim 88 in FIG. 5, cover an angle 90 of about 110° around the axes 72 and 73 respectively. The rims 88 and 89 are located on the proximal sides of the funnel-shaped outlet parts 40 and 41. As is shown for the rim 88 in FIG. 5, each rim has three apertures, one aperture 91 being located centrally along the rim 88 and the apertures 92 and 93 being located near the ends of the rim.

The dosing plate 86 has two dosing openings 94 and 95 corresponding with the ports 66 and 67. In a similar manner the dosing plate 87 has two dosing openings 96 and 97 corresponding with the ports 68 and 69. The openings 94 to 97 are identical to each other and the openings 94 and 95 are mirror images of the openings 96 and 97 with respect to the vertical plane 29. The shape of each of the openings 94 to 97 slightly differs from that of each of the ports 66 to 69, as will be described more fully for the opening 95.

Figure 5:
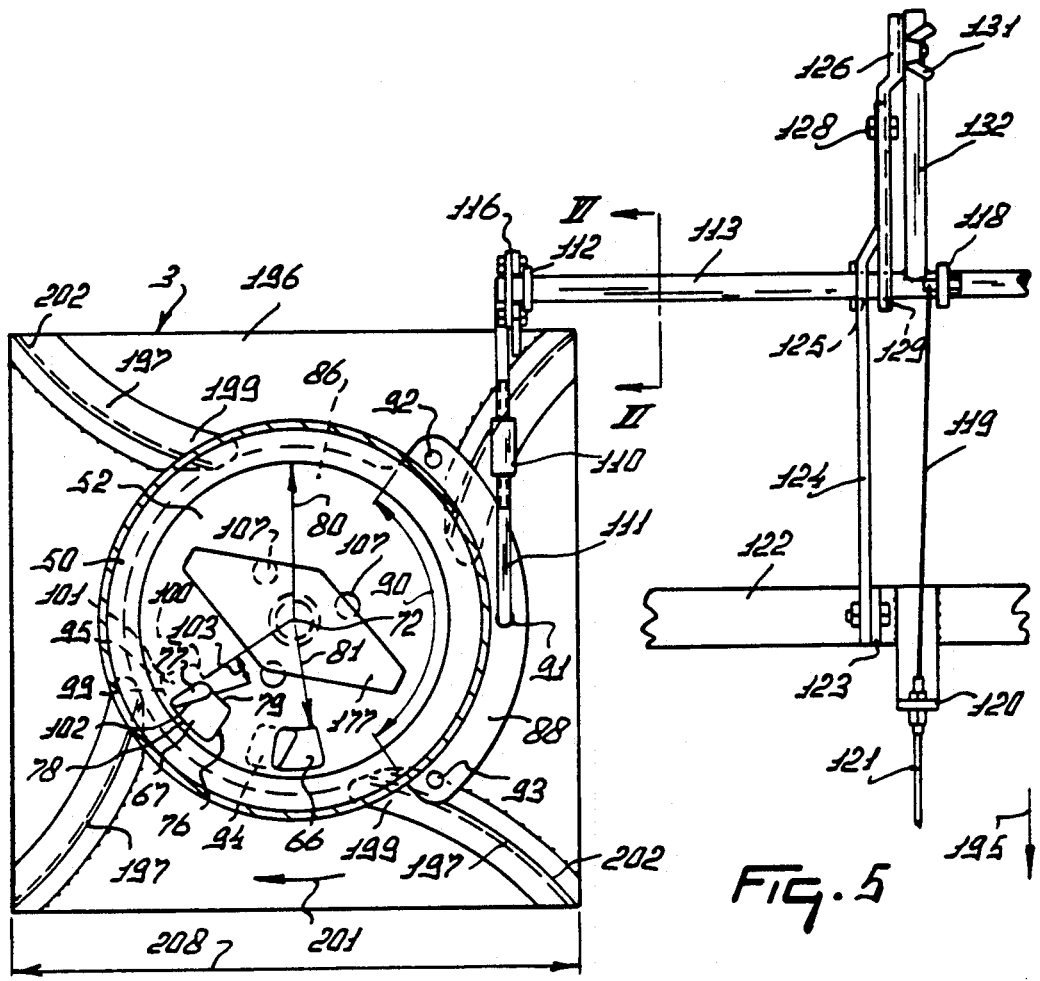
FIG. 5 is a plan view from above of the part of the device shown in FIG. 4 taken on the line V—V in FIG. 4.
Figure 6:
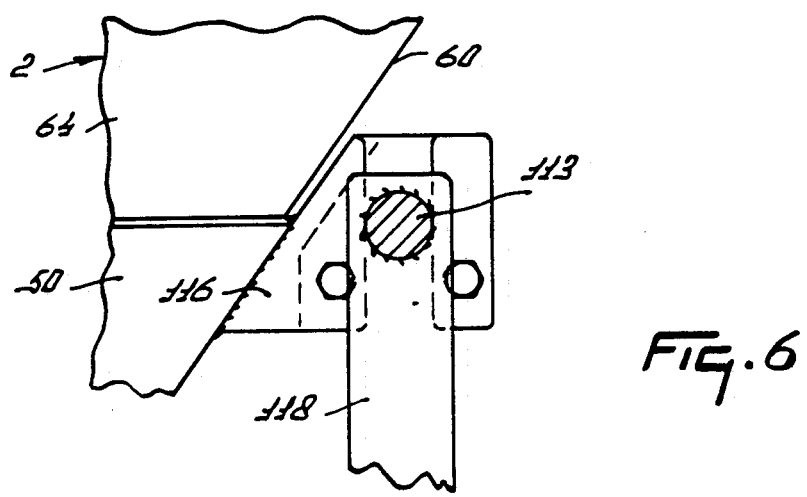
FIG. 6 is a sectional view on a larger scale of a detail of the part shown in FIGS. 4 and 5, taken on the line VI—VI in FIG. 5.

From FIG. 5 it will be apparent that the opening 95 has two curved sides 99 and 100 which are concentric to the axis 72 and are spaced apart from the axis 72 by the same distances as the sides 78 and 79 of the port 67. Further, the opening 95 has a side 101 which extends in a plane radial of the axis 72. This side 101 is located on that side of the opening 99 which is remote from the opening 94. The remaining side 102 of the opening 95 is at an angle 103 of about 20° to a radial plane passing through the axis 72 and the end of the side 102 remote from the axis 72.

As is shown in detail in FIG. 4 for the plate 86, each of the dosing plates is supported by a supporting ring 106 which is fastened to the bottom 52 by means of bolts 107. Between the bottom 52 and the supporting ring 106 there is a spacer ring 108 which is slightly thicker than the dosing plate 86. The spacer ring 108 has a diameter slightly smaller than the supporting ring 107, as will be seen from FIG. 4, so that between the bottom 52 and the supporting ring 106 a groove is formed in which the plate 86 is located so that it can turn around the spacer ring 108 while bearing on the supporting ring 106.

The dosing plate 86 is pivoted to a setting arm 111, one end of which is engaged in the aperture 91 of the rim 88 in the operational condition illustrated. The setting arm 111 is pivoted to an arm 112 which is rigidly coupled with a setting shaft 113. In the same manner as described for the dosing plate 86, the dosing plate 87 is coupled through a setting arm 114 with an arm 115 which is also rigidly secured to the shaft 113 so that the arms 112 and 115 occupy identical positions relative to the shaft 113. One of the setting arms 111 and 114 has an arm lengthening member 110 so that the distance between the rims of the dosing plates and the arm concerned of the setting shaft 113 can be slightly varied. As illustrated the member 110 is provided in the arm 111. The shaft 113 is rotatably journalled in a support 116, which is fastened to the lower end 50 of the outlet part 40, and in a support 117 which is fastened to the lower end 51 of the outlet part 41. Near the center of the machine the shaft 113 has a coupling arm 118 which is displaced 180° with respect to the arm 112. The coupling arm 118 is connected with an operating cable 119 which is held in a support 120 and passed, on the side of the support 120 remote from the arm 118, through an outer cable 121. The support 120 is carried by a bridge support 122 of strip form which is connected with the proximal sides of the lower parts 50 and 51 of the outlets 40 and 41 of the hopper 2.

Near the support 120 the bridge support 122 is provided with a lug 123 to which an arm 124 is rigidly secured. The arm 124 extends away from the bridge support 122 to beyond the setting shaft 113 and has a bore 125 through which passes the shaft 113. The arm 124 is provided by means of a bolt 128 with an indicator plate 126 having gauge markings 127. Apart from its connection with the arm 124 the indicator plate 126 is supported by the shaft 113, the plate 126 having a bore 129 receiving the shaft 113. The bores 125 and 129 are such that the shaft 113 can turn therein. The indicator plate 126 has an elongated hole 130 in which a displaceable stop 131 is slidably arranged. The setting shaft 113 is provided with a stop arm 132 which is rigidly coupled with the setting shaft. The stop arm 132 covers a distance beyond the shaft 113 which is equal to the distance covered by the indicator plate 128 beyond the shaft 113, as is shown in FIGS. 2 and 5.

The distributing members 3 and 4 are fastened to upright shafts 140 and 141 respectively. The shafts 140 and 141 are journalled in bearings 142 and 143 on an elongated, square-section gear box 144. The construction and the connection of the bearings 142 and 143 are identical and shown in detail for the bearing 142 in FIG. 9. The gear box 144 contains a coupling shaft 145 which covers the whole length of the box 144 and is journalled in bearings 146 and 147, as is shown for the bearing 146 in FIG. 9 in detail. Near the bearings 146 and 147 the box 144 is closed by lids 148. The box 144 is fastened by means of two brackets 149 to supports 150 which are on the limbs 11 and 12 of the supporting beam 10. Near the lower ends the shafts 140 and 141 are provided, as is shown for the shaft 140 in FIG. 9, with bevel pinions 151 which co-operate with bevel pinions 152 near the ends of the shaft 145. Near the center of the device and of the gear box 144 the shaft 145 is provided with a bevel pinion 153. In the zone of this pinion 153 the shaft 145 in the box 144 is furthermore supported by a bearing 154. To one side of the bearing 154 the gear box has a filling aperture 138 with a closing cap 139. Through this aperture oil can be introduced into the box 144 for lubricating the various transmission members and the bearings in the box 144.

The pinion 153 co-operates with a pinion 155 on a junction shaft 156, the center line of which is located in the vertical plane 29. The shaft 156 is journalled in a bearing housing 157 supported on the box 144. In the side of the bearing housing 157 remote from the box 144, the shaft 156 terminates in a change-speed gear box 158. The portion of the shaft 156 located in the change-speed gear box 158 is provided with a spur pinion 159 having a hub 160. The pinion 159 is in mesh with a spur pinion 161 on a driving shaft 162. The driving shaft 162 is journalled in a bearing 163 in the box 158 and a bearing 164 on a support 165, which is fastened to the box 144. The support 165 is located on the front of the box 144 opposite the change-speed gear box 158.

Figure 7:
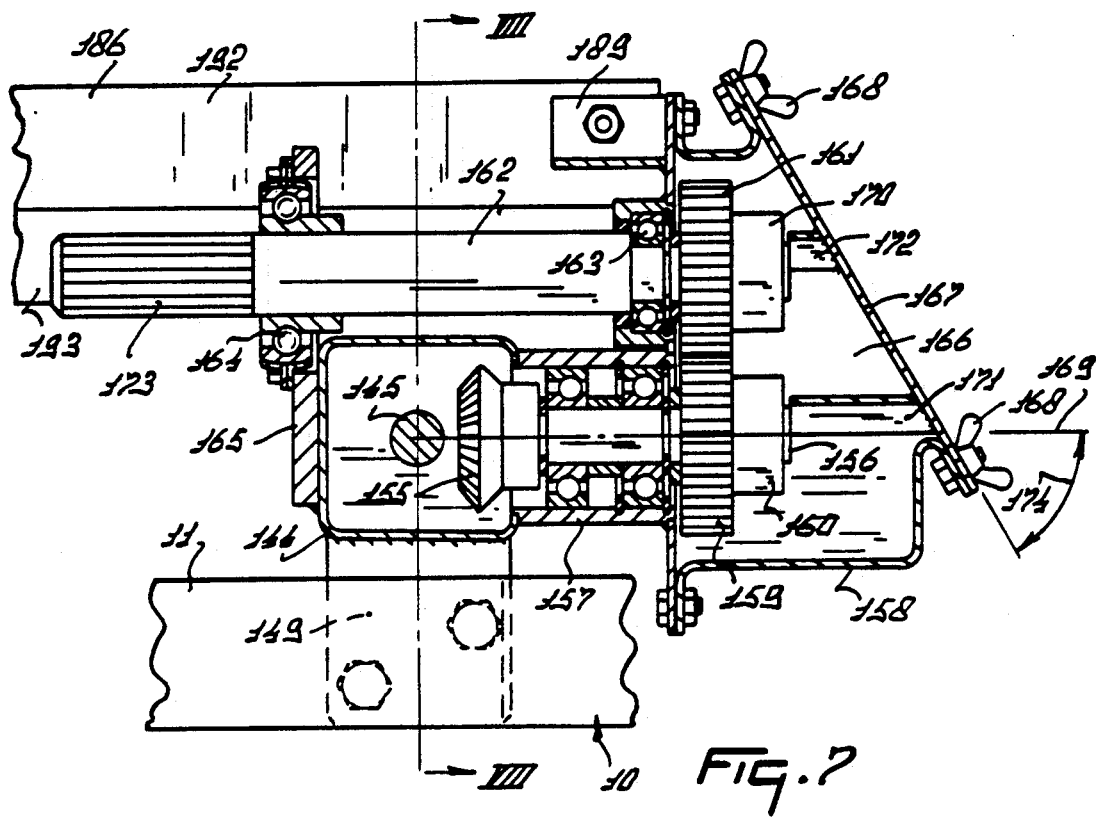
FIG. 7 is a vertical sectional view on a larger scale of part of drive mechanism for distributing members of the device of FIGS. 1 to 6, taken on the line VII—VII in FIG. 1.
Figure 8:
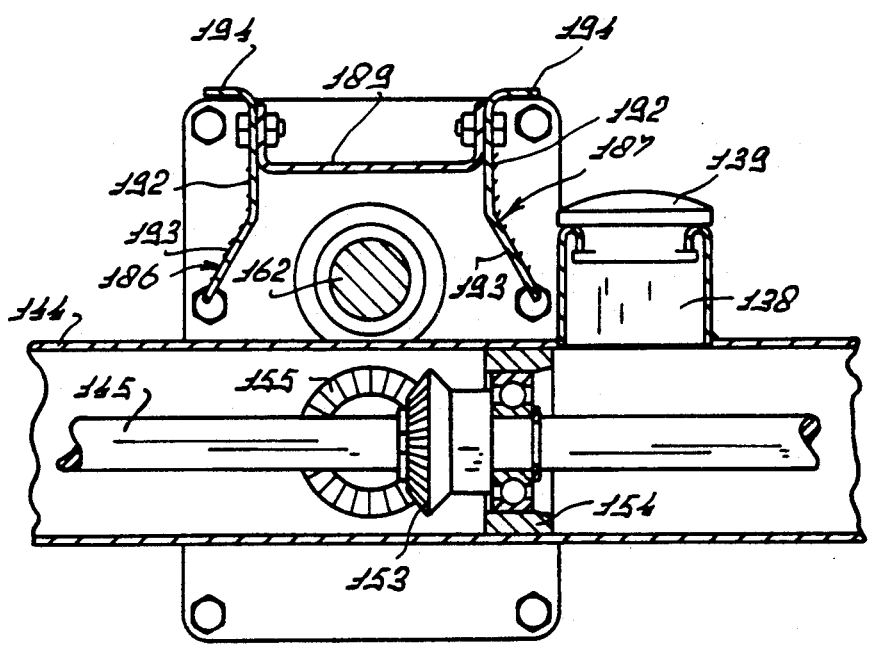
FIG. 8 is a sectional view taken on the line VIII—VIII in FIG. 7.
Figure 9:
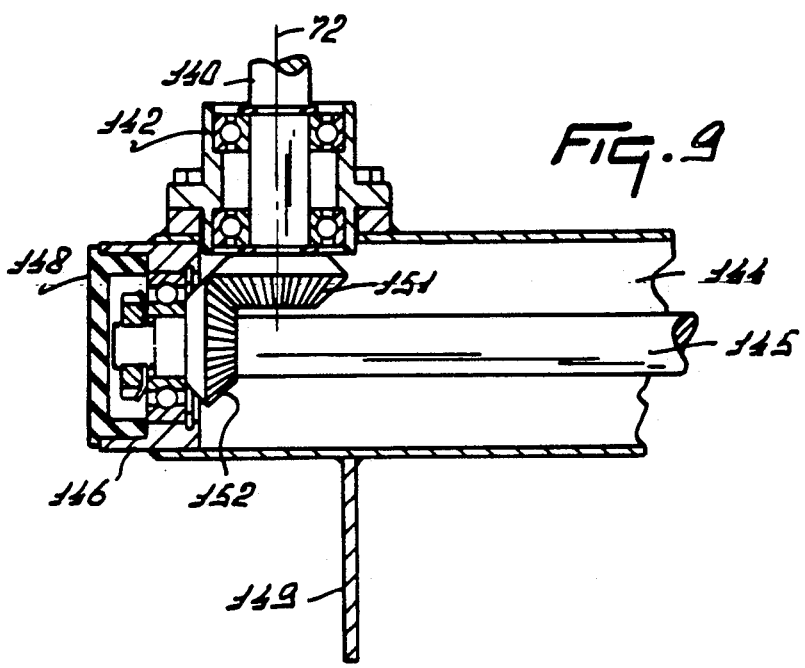
FIG. 9 is a vertical sectional view on a larger scale of a further part of the drive mechanism for the distributing members, taken on the line IX—IX in FIG. 2.

On the side remote from the gear box 144 the change-speed gear box 158 has an opening 166 which has a slightly inclined disposition, as is shown in FIG. 7, and which is closed by a removable cover 167 which is at an angle 174 of about 60° to the horizontal. The cover 167 can be readily removed from, or placed on, the box 158 by means of wing nuts 168. The lower edge of the opening 166 is located at the level of a horizontal plane 169 passing through the center line of the junction shaft 156 and the coupling shaft 145. Apart from their numbers of teeth, the pinions 159 and 161 are identical and the pinion 161 has a hub 170. The ends of the hub 160 and the hub 170 facing the cover 167 are located in a vertical plane at right angles to the plane 169. The cover 167 is provided with curved supports 171 and 172 the ends of which remote from the cover 167 extend into the proximity of the hubs 160 and 170 respectively and across the ends of the shafts 156 and 162 respectively, as will be seen from FIG. 7.

At the end remote from the change-speed gear box 158 the driving shaft 162 is provided with a splined portion 173 emerging out of the bearing 164. The splined portion 173 constitutes a coupling end for an auxiliary shaft. The shaft 162 is located perpendicularly above the shaft 156 so that the center line of the shaft 162 is also located in the vertical plane 29.

The shafts 140 and 141 of the spreading members 3 and 4 extend, as is shown in FIG. 4, through central openings in the supporting ring 106, the spacer ring 108 and the bottom 52. The bottom 52 has an upwardly extending rim 176. Agitators 177 and 178 are arranged at the top ends of the shafts 140 and 141 respectively. These agitators are made from strip material and extend parallel to the respective bottoms 52 and 53 (FIG. 4). Viewed in plan, as shown in FIGS. 3 and 5, the agitators have the shape of a parallelogram with topped ends. The agitators 177 and 178 have hubs 179 fastened to the respective shafts 140 and 141 by means of pins 180.

Each of the distributing members 3 and 4 is surrounded by a screen 186, 187 respectively. The screens 186 and 187 are formed symmetrically with respect to the vertical plane 29 and cover each an angle of about 150° around the respective rotary axes 72 and 73. The screens 186 and 187 are fastened at their proximal ends 190, 191 to a support 189 arranged on the change-speed gear box 158. The proximal ends 190 and 191 of the screens are substantially parallel to one another and spaced apart by a distance substantially equal to the width of the change-speed gear box 158. As is shown in FIG. 2, each of the screens 186 and 187 has a vertical portion 192 which is located at the level of the distributing members and which has a height which is at least equal to or slightly larger than the height of a distributing member. At a level below the distributing member each of the screens has an inclined rim 193 which is directed downwards towards the rotary axis of the respective distributing member. Near the top at a level above the top of the relevant distributing member each screen has a bent-over rim 194 directed towards the rotary axis of the distributing member concerned.

The distributing members 3 and 4 are identical and the distributing member 3 will be described more fully with reference to FIG. 5. The distributing member 3 comprises, viewed in plan, a square ejection disc plate 196. Near the center this plate has a conical part 198 having an annular shape, viewed in plan. Beyond the part 198 the plate 196 is flat and normal to the rotary axis 72 of the distributing member. This flat part is provided with four curved blades 197, the inner ends 199 of which join the outer circumference the conical part 198. Viewed on plan, this circumference is located only at a slight distance beyond an imaginary circle around the axis 72 passing through the sides 78 and 99 of the ports 66, 67 and 94, 95 respectively (FIG. 5). The ends 202 of the blades are located at the corners of the plate 196, which has a square shape viewed in plan. The blades 197 are curved so that with respect to the direction of operative rotation 201 the inner ends 199 lead with respect to the outer ends 202. Within the conical part 198 the distributing member has a flat part 203, the diameter of which is smaller than the diameter of the circle passing through the sides 79 and 100 of the ports 66, 67 and 94, 95 respectively.

The part 198 has a height 204 substantially equal to the mean height of the ejection blades 197. The conical part 198 is at an angle 205 of about 25° to the plate 196. The inner end of each blade has a height 206 of about forty millimeters. The height 207 of the outer end of each blade is equal to about three quarters of the height 206 and amounts to about thirty-two millimeters. The diameter 200 of the circumference of the conical part 198 is substantially equal to half the distance 208 between opposite sides of the ejection disc plate 196, this distance 208 being about forty centimeters. The diameter 209 of the circle around opposite corners of each ejection disc plate 196 amounts to about fifty-seven centimeters. The diagonals of the distributing members 3 and 4 are relatively off-set through 45° about the respective rotary axes 72 and 73, as is shown in FIG. 3. The distance 49 between axes 72 and 73 is about one and a half times the distance 209.

As mentioned above, the distributing member 4, which is not shown in detail, is identical to the distributing member 3, the distributing members 3 and 4 being relative mirror images of one another with respect to the vertical plane 29.

When the device is to be used it is hitched to the lifting device of a tractor. The lower arms of the lifting device are coupled between the plates 23 and 24, and the plates 25, 26 respectively, whereas the top arm can be coupled with the frame between the plates 32 and 33. The lifting arms can be coupled with the respective plates by passing a coupling pin through the respective holes 30 or 31 and 34. In this embodiment the side of the device coupled with the lifting device of the tractor is the front side. The device may, however, also be coupled with a vehicle provided, for example, at its front with a lifting device in which case the front side of the device becomes the rear side of the device with respect to the direction of operative travel over the ground.

In this embodiment the device is moved in operation in the direction of the arrow 195. When the device is attached to the tractor the end 173 of the driving shaft 162 is coupled by means of an auxiliary shaft with the power take-off shaft of the tractor. The operating cable 119 with the outer cable 121 can be coupled by means of a coupling member (not shown) having a control-arm with the tractor to give a sort of a Bowden cable arm arrangement in such a way that the cable 119 can be drawn or pushed for actuating the arm 118 as will be described more fully hereinafter.

The device is intended for dispensing granular or powdery material or both, which can be carried in the hopper 2. The material can be supplied from the hopper through the funnel-shaped parts 40 and 41 and the outlet ports 66, 67 and 68, 69 respectively to the distributing members 3 and 4 respectively. The amount of material to be supplied to the distributing members per unit time can be controlled by setting the dosing plates 86 and 87 with respect to the bottoms 52 and 53 so that the ports 94, 95 and 96, 97 respectively more or less overlap the ports 66, 67 and 68, 69 respectively. The material falling though the ports out of the hopper arrives at the conical portion 198 of the distributing member concerned. From this conical portion the material flows effectively towards the beginning or leading edge of each blade located nearest the rotary axis of the distributing member, by which it can be evenly spread across the desired sector. It is important in this respect that the distance 81 between the axis 72 and the side 79 of the outlet ports should be equal to about one eighth of the diameter 209 of the circle around opposite corners of each plate 196.

The distributing members 3 and 4 are driven from the power take-off shaft and the driving shaft 162 via the pinions 159 and 161 and the bevel pinions in the gear box 144 so that they rotate in opposite senses, the proximal edge portions of the distributing members moving in the direction of arrow 195, that is, in the direction of travel over the ground. The speed of rotation of the distributing members about their rotary axes 72 and 73 is preferably adjustable. In this embodiment the speed of rotation of the distributing members can be adjusted by exchanging the pinions 159 and 161 for other pinions. The pinions 159 and 161 are fastened by means of splines (not shown) to the shafts 156 and 162 respectively so that they are slidable along these shafts for ready replacement by other pinions. For replacing the pinions 159 and 161 by other pinions, or for interchanging them, the cover 167 can be removed from the change-speed gear box 158 by loosening the wing nuts 168. When the cover 167 is removed the supports 171 and 172 are also removed, which supports prevent movement of the interchangeable pinions 159 and 161 along the shafts 156 and 162 when the cover 167 is in place. An appropriate set of pinions consists of pinions for the shaft 156 having 14 to 21 or 23 teeth respectively and pinions for the shaft 162 having 12 or 14 to 21 teeth respectively. The potential combinations of such a set of pinions permit selecting a speed of rotation of the distributing members between about 280 and about 810 rev/min with a speed of rotation of the power take-off shaft of the tractor of 540 rev/min. The transmission ration between the bevel pinions in the gear box 144 is 1:1.

The location of the passage above each of the distributing members is such that each of the distributing members mainly spreads the material in a direction, opposite the direction of movement 195 across the ground, extending over substantially equal distances on either side of the vertical plane 29. Thus the material spread by the distributing member 3 is deposited on the same sector as the material spread by the distributing member 4. By causing the two distributing members to spread the material across the same sector during the operation of the device any irregularities in the distribution by one distributing member will tend to be eliminated by the other distributing member. In this way a very uniform distribution of the material is obtained throughout the width covered by the device during each run. Thus uniform distribution is further enhanced by the fact that the locations of the ejection blades of the distributing members around the rotary axes 72 and 73 respectively are relatively off-set through 45° as will be apparent from the position of the ejection disc plates 196 indicated by broken lines in FIG. 3.

The size of the passage through the outlet ports 67, 66 and 68, 69 respectively is determined by the extend of overlap of the openings 94, 95 and 96, 97 and the ports 66 to 69. This overlap can be varied via the operating cable 119, by which the shaft 113 can be turned. Through the setting arms 111 and 112 rotation of the shaft 113 results in rotation of the dosing plates 86 and 87 around the rotary axes 72 and 73 respectively. The stop arm 132 is fastened to the shaft 113 in a manner such that near the lower end of the slot 130 in the guide plate 126 this arm engages a fixed stop 133, at which position the outlet ports 66 to 69 are completely closed and do not at all coincide with any one of the dosing apertures 94 and 95 or 96 and 97. By turning the shaft 113 in a manner such that the arm 132 moves upwards as shown in FIG. 2, the openings 94 to 99 are brought into overlapping relationship with the ports 66 to 69. When the arm 132 is located near the top end of the slot 130 the openings 94 to 97 fully overlap the ports 66 to 69. By means of the adjustable stop 131 the upward movement of the arm 132 can be limited. Thus a position can be set that is known to result in a desirable maximum overlap of the openings 94 to 97 and the ports 66 to 69. The stop 131 may, for example, be set so that the arm 132 can be moved upwards only to an extent such that the outlet ports overlap by only half their size the dosing openings. The stop arm 132 can be moved rapidly from the fixed stop 133 towards the adjustable stop 131 for opening or closing the outlet ports to the desired extent. The sides 78 of the openings 94 to 97, which are first to get below the outlet ports or last to move away from below these ports when the ports 66 to 69 are opened or closed respectively, do not extend radially as has been explained for the side 78. It is thus ensured that when only a small portion of the outlet ports 66 to 69 is open the size of the passages will be such that the material can readily flow out of the hopper.

The setting arms 111 and 114 may be coupled with the respective dosing plates at least two different places. In this embodiment the setting arms may alternatively be arranged in the openings 92 or 93 of the dosing member 86 or 87 respectively. By arranging, for example, the setting arm 111 in the opening 92, the dosing plate 86 is turned so that the opening 94 can co-operate with the port 67, whereas the port 66 remains constantly closed. Thus, for example, only the ports 67 and 69 will allow material to pass to the distributing members. Thus the amount of material distributed per unit time and the width of spread can be reduced. The arms 111 and 114 may also be arranged in the openings 93 of the dosing plates 86 and 87. Then the openings 95 and 97 will co-operate with the ports 66 and 68. Thus the width of spread remains larger than in the case in which material is only supplied through the ports 67 and 69 to the distributing members. For the mentioned co-operation between the openings in the dosing plate and the outlet ports it is essentional that the angle between the openings 91 and 93 and the openings 91 and 92 is equal to the angle through which the centers of the outlet ports 66 and 67 are off-set around the rotary axis 72. As a further alternative one of the setting arms may be uncoupled from the dosing plate concerned, the dosing plate being retained in the position in which the outlet ports concerned remain closed, in which case the material can be fed only from one outlet port 40 or 41 to the distributing member 3 or 4. Thus the quantity of material spread over a strip of land can be appreciably reduced. When the outlet port most remote from the plane 70 or 71 is held in the closed state, the material can be spread more to one side of the device. The relative positions of the dosing plates 86 and 87 can be slightly post-adjusted by means of the lengthening member 110 in the setting arm 112, the length of which arm can thus be slightly varied.

Figure 10:
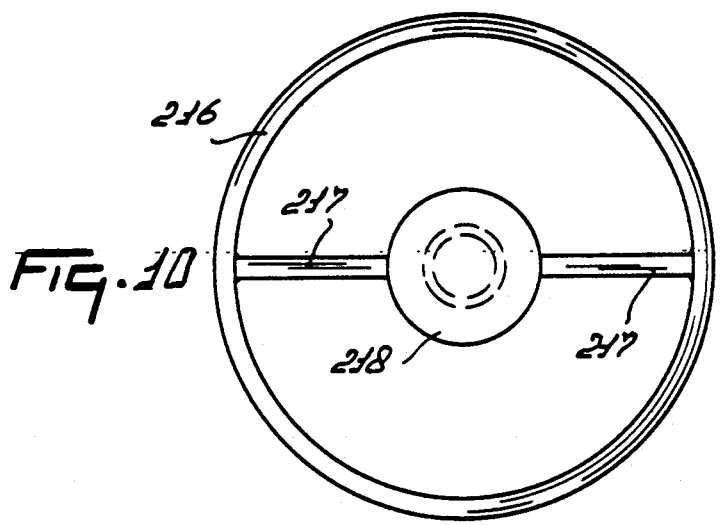
FIG. 10 is a detail view showing an alternative form of an agitator located near an outlet of a hopper of a device such as illustrated in FIGS. 1 to 9.

The agitatiors 177 and 178 serve to assist the flow of material through the outlet ports. These agitators rotate with the same speed around the rotary axes 72 and 73 as the distributing members. The agitators 177 and 178, which are fastened to the shafts of the distributing members by means of pins, may have a shape different from that illustrated from the device of FIGS. 1 to 9. For example, FIG. 10 shows an agitator comprising a ring 216 fastened by means of two spokes 217 to a hub 218. The hub 217 corresponds with the hub 179 shown in FIG. 4. With certain kinds of material the agitator shown in FIG. 10 may be more successful for passing the material to be spread through the outlet ports without the material being pulverized to a greater or lesser extent.

Figure 11:
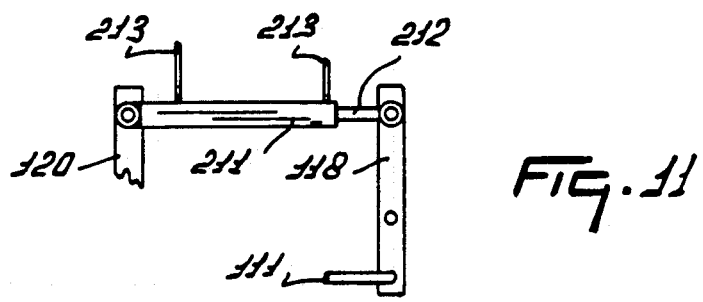
FIG. 11 shows an alternative form of part of a setting mechanism for dosing members of a device such as illustrated in FIGS. 1 to 9.

FIG. 11 shows schematically an alternative manner of operating the coupling arm 118, which together with the shaft 113 and accessories constitutes a setting mechanism for regulating the dosing plates 86 and 87. As is shown in FIG. 11 a double-acting hydraulic ram 211 is arranged between the coupling arm 118 and the support 120, pivotally supported by the support 120. The piston rod 212 of this ram is pivoted to the arm 118. The ram 211 is coupled by means of hydraulic lines 213 with a hydraulic control-mechanism on the tractor so that at will, by means of the ram 211 and the rod 212, the distance between the supports 120 and the arm 118 can be enlarged or reduced for turning the setting shaft 113 and hence the dosing plates 86 and 87 together or separately.

Although in the embodiment shown a single, long gear box 144 is used, this long box may be replaced by two small boxes for the pinions 151 and 152 for each distributing member and a further box holding the bevel pinions 153 and 155 and the interchangeable pinions 159 and 161.

The lugs 35 and 36 constitute a drawhook for attaching a further implement to be moved together with the device shown. The partition 61 divides the hopper 2 into two compartments. If desired different kinds of material can be carried in the separated hopper compartments, in which case each distributing member spreads a different kind of material. However, usually the hopper compartments will contain the same kind of material. The two distributing members spread the material across the same sector about their rotary axes, so that the uniformity of the distribution pattern across the area is enhanced.

Although various features of the devices that have been described, and are illustrated in the drawings, will be set forth in the following claims as inventive features, it is to be noted that the invention is not necessarily limited to these features but is intended to encompass all novel and inventive features that have been described both individually and in various combinations.

We claim:

1. A device for spreading granular and powdery materials comprising a frame which includes means so constructed and arranged to connect to a three-point lifting device of a tractor, a hopper for the material to be spread which is carried by said frame and at least two rotatable distributing means drivable in opposite rotational directions about upwardly extending rotary axes, characterized in that when portions of said distribution means are moving nearest each other they are moving generally in the direction of said connection means for a tractor's three-point lifting device, said hopper having two side-by-side funnel-shaped parts, feeding means being provided at the bottom of each said funnel-shaped part for performing the function of feeding material from said hopper to each said distributing means, each said distributing means receiving material from said feeding means eccentrically with respect to its corresponding said rotary axis and comprising at least one ejection means performing the function of spreading the material so received within a predetermined sector which extends over substantially equal distances on either side of a vertical plane passing through the center of the device parallel to its intended direction of operative travel and away from said connection means for a tractor's three-point lifting device; said ejection means of one said distributing means being angularly offset with respect to said ejection means of the other said distributing means so that material is ejected in an alternating sequence from said distributing means, said distributing means being driven in a manner cooperating with the disposition of said feeding means and so constructed and arranged that in operation each of said distributing means performs the function of spreading material across said sector relative to its corresponding said rotary axis which coincides throughout its greater extent with the sector across which the other said distributing means spreads material.

2. A device as claimed in claim 1, wherein with respect to the intended direction of operative travel of the device, said distributing means are located substantially side-by-side at the same level.

3. A device as claimed in claim 2, wherein said distributing means are formed symmetrically with respect to a vertical plane located between said distributing means and extending in the intended direction of operative travel of the device.

4. A device as claimed in claim 1, wherein said rotary axes of said distributing means are parallel to one another.

5. A device as claimed in claim 4, wherein said distributing means circumscribe in rotation outer diameters which are equal and said rotary axes of said distributing means are spaced apart by a distance substantially equal to one-and-a-half times each said diameter.

6. A device as claimed in claim 1, wherein said distributing means are arranged whereby said rotary axes are substantially perpendicular to the underlying ground surface for receiving material during operation of the device.

7. A device as claimed in claim 1, wherein said feeding means are arranged so that material is supplied to each of said distributing means on that side of a plane passing through the rotary axes of said distributing means which is located opposite the side wherein most of the material is being spread by said distributing means during the operation of the device.

8. A device as claimed in claim 7, wherein said feeding means supply material to be spread to said distributing means substantially on opposite sides of planes passing through said rotary axes and extending in the intended direction of operative travel of the device.

9. A device as claimed in claim 8, wherein said feeding means supply material to said distributing means at a distance from said rotary axes thereof.

10. A device as claimed in claim 9, wherein each said feeding means has at least one outlet port provided in a wall of said hopper whereby viewed in plan, a said outlet port is located above each said distributing means.

11. A device as claimed in claim 10, wherein said outlet port is provided in a bottom of said hopper which is substantially parallel to the plane of rotation of the corresponding said distributing means.

12. A device as claimed in claim 10, wherein said hopper has two said outlet ports above each said distributing means, said two ports being located at equal distances from said rotary axis of their corresponding said distributing means.

13. A device as claimed in claim 12, wherein each said outlet port is located at a distance from said rotary axis of its corresponding said distributing means which is substantially equal to one-eighth of the outer diameter circumscribed by rotation of the corresponding said distributing means.

14. A device as claimed in claim 13, wherein said outlet ports are each bounded by two sides which are concentric to the corresponding said rotary axis of its corresponding said distributing means and two opposite sides which extend radially to the corresponding said rotary axis.

15. A device as claimed in claim 10, wherein each said distributing means comprises a conical portion located, viewed in plane beneath its corresponding said outlet port of said hopper.

16. A device as claimed in claim 15, wherein the outer diameter of said conical portion of said distributing means is substantially equal to twice the distance between the part of said corresponding outlet port most remote from said rotary axis of the corresponding said distributing means and the said corresponding rotary axis.

17. A device as claimed in claim 15, wherein each said distributing means has a central part which is substantially at right angles to its corresponding said rotary axis, and wherein said central part includes an outer diameter which is the diameter of a circumference of said conical portion, said diameter being smaller than twice the distance between the corresponding said rotary axis of the corresponding said distributing means and the part of said outlet port associated therewith nearest the corresponding said rotary axis.

18. A device as claimed in claim 15, wherein said conical portion is at an angle of about 25° to a plane at right angles to the corresponding rotary axis of the corresponding said distributing means.

19. A device as claimed in claim 18, wherein outside said conical portion each said distributing means has a flat portion which is substantially at right angles to said rotary axis of the corresponding said distributing means.

20. A device as claimed in claim 1, wherein viewed in plan, each said distributing means has a substantially square configuration.

21. A device as claimed in claim 20, wherein each said distributing means comprises a centrally disposed conical portion and is provided with a plurality of said ejection means comprising blades which are curved viewed in plan and the ends of which located nearest said rotary axis of the said corresponding distributing means are located on a circle, the diameter of said circle being substantially equal to the outermost diameter of said conical portion of said distributing means.

22. A device as claimed in claim 1, wherein each said distributing means has a polygon configuration as seen in plan and is provided with a number of said ejection means equal to the number of straight sides of its periphery.

23. A device as claimed in claim 22, wherein each said ejection member comprises a blade which has a substantially rectangular, channel-shaped cross-section.

24. A device as claimed in claim 22, wherein the extremities of said blades are located near the corners of two adjoining said straight sides of the periphery of the corresponding said distributing means.

25. A device as claimed in claim 24, wherein each blade of each said distributing means has a height decreasing from one end to the other, the height of the end located nearest said rotary axis of said distributing means being the larger.

26. A device as claimed in claim 25, wherein with respect to the direction of rotation of each said distributing means, the part of each said blade farthest remote from said rotary axis of the corresponding said distributing means lags relatively to the beginning of the corresponding blade end located nearest the associated said rotary axis.

27. A device as claimed in claim 1, wherein said hopper has a wall which includes an outlet, said feeding means comprising a dosing mechanism for metering the amount of material supplied per unit time from said hopper to each distributing means located near said outlet.

28. A device as claimed in claim 27, wherein, for each said distributing means, a said dosing mechanism is formed by a dosing plate having at least one outlet which is movable with respect to said outlet of said hopper wall whereby said outlet can optionally be opened or closed to a greater or lesser extent.

29. A device as claimed in claim 28, wherein for each said distributing means, said dosing plate is located beneath the hopper bottom and is rotatable about said rotary axis of the corresponding said distributing means, said plate adapted to be secured in any one of a plurality of positions with respect to said hopper.

30. A device as claimed in claim 29, wherein said dosing plate is rotatably arranged between the bottom of said hopper and a supporting ring secured to said bottom.

31. A device as claimed in claim 28, wherein said dosing plate has a plurality of said outlet ports, an equal number of said outlets being provided in said hopper wall which are associated with said outlet ports of said dosing plate.

32. A device as claimed in claim 28, wherein each of said dosing plate's outlet port is bounded by four sides, two opposite sides of which are concentric with the rotary axis of the corresponding said distributing means and two further opposite sides of which are straight, one said straight side extending radially to said rotary axis of the corresponding said distributing means.

33. A device as claimed in claim 32, wherein one of said straight sides is at an angle of about 20° to a radial line passing through the end of said side located farthest from the corresponding said rotary axis.

34. A device as claimed in claim 33, wherein said one straight side that is at an angle to said radial line is that side of outlet port which is first to co-operate with said hopper outlet when opened and which is last to co-operate therewith when closed by means of said dosing member.

35. A device as claimed in claim 32, wherein said dosing outlet port and a further outlet port in said dosing plate are spaced apart by equal distances from said rotary axis of the corresponding said distributing means and by an equal distance from one another and wherein said hopper outlet and a further hopper outlet have a substantially congruent disposition.

36. A device as claimed in claim 35, wherein said two dosing outlets together define an angle of about 70° around said rotary axis of the corresponding said distributing means.

37. A device as claimed in claim 28, including a setting mechanism which has a setting arm for each said dosing plate, wherein each said dosing plate has a rim to which a corresponding said setting arm is pivoted, said setting arms joining said dosing plates with said setting mechanism.

38. A device as claimed in claim 37, wherein each said setting arm is adapted to be coupled with its corresponding said dosing plate at at least two different places.

39. A device as claimed in claim 38, wherein said two different places are relatively off-set through an angle equal to the angle through which the centers of said outlets in said hopper bottom are relatively off-set around the corresponding said rotary axis.

40. A device as claimed in claim 39, wherein the number of places where each said setting arm can be coupled with the corresponding said dosing plate exceeds by one the number of said outlets in the hopper.

41. A device as claimed in claim 37, wherein said setting mechanism includes a setting shaft and each said setting arm is pivotally coupled with an arm member rigidly secured to said setting shaft.

42. A device as claimed in claim 41, wherein each said setting shaft is journalled in supports fixed to said hopper.

43. A device as claimed in claim 42, wherein outlet funnels are provided in said hopper, the lower end of each said outlet funnel including a separately formed lower portion fixed to the remaining part of said hopper, the supports for said setting shaft being secured to said lower portions.

44. A device as claimed in claim 43, wherein said setting shaft is at right angles to the intended direction of operative travel of the device.

45. A device as claimed in claim 44, wherein said setting shaft is located on that side of the device where material is spread during the operation of the device.

46. A device as claimed in claim 42, including a control mechanism for controlling the amount of material being spread and a coupling arm connected thereto, wherein said setting shaft is provided with said control mechanism adapted to be actuated by an operator in a vehicle associated with the device.

47. A device as claimed in claim 46, wherein said control mechanism is supported by a bridge support arranged between two outlet ends of said hopper.

48. A device as claimed in claim 47, wherein said bridge support is located in a plane passing through two said rotary axes of said distributing means.

49. A device as claimed in claim 47, wherein said bridge support is provided with a support with which is coupled said control-mechanism which comprises a control-member extending between the last-mentioned support and said coupling arm.

50. A device as claimed in claim 49, wherein a connecting member is provided between said coupling arm and said last-mentioned support which is formed by a Bowden cable arrangement which is adapted to extend between said last-mentioned support and a vehicle associated with the device.

51. A device as claimed in claim 49, comprising a hydraulically actuable connecting member which is provided between said coupling arm and said support.

52. A device as claimed in claim 51, wherein said hydraulically actuable connecting member comprises a double-acting hydraulic ram.

53. A device as claimed in claim 46, wherein said setting shaft is provided with a stop arm adapted to be moved along a guide plate provided with a fixed stop with which said stop arm co-operates.

54. A device as claimed in claim 53, wherein said guide plate is supported by said setting shaft and an arm on said bridge support, said latter arm being furthermore supported by said setting shaft.

55. A device as claimed in claim 53, wherein said stop arm and said guide plate are disposed near said coupling arm on said setting shaft.

56. A device as claimed in claim 50, wherein said coupling arm and said control-mechanism are near a vertical plane lying in the intended direction of travel of the device and coinciding with the longitudinal axis of the device.

57. A device as claimed in claim 56, wherein said rims of said dosing plates provided with said setting arms are arranged on the proximal sides of two outlet funnels beneath which said dosing plates are located.

58. A device as claimed in claim 57, wherein said bridge support is fastened to the lower portions of said outlet funnels of said hopper.

59. A device as claimed in claim 37, wherein said setting mechanism includes a setting shaft and at least one of two said setting arms comprises a fine-adjustment mechanism by which the length of said arm between said setting shaft and the fastening place of said setting arm with said dosing plate is adapted to be varied.

60. A device as claimed in claim 37, wherein at least one of two said setting arms is releasably coupled with its associated said dosing plate.

61. A device as claimed in claim 1, wherein drives of two said distributing means are coupled whereby the speeds of rotation of the two said distributing means are in a fixed relationship to one another.

62. A device as claimed in claim 61, wherein said drives are adapted to drive said two distributing means with equal speeds of rotation.

63. A device as claimed in claim 61, comprising an adjusting mechanism wherein said drives are both coupled to said adjusting mechanism, the speeds of rotation of said distributing means adapted to be varied simultaneously by said adjustment mechanism.

64. A device as claimed in claim 63, wherein said adjusting mechanism comprises two relatively cooperating pinions which can be interchanged with pinions having different numbers of teeth.

65. A device as claimed in claim 61 wherein said drives comprise a driving shaft which is adapted to be coupled with a driving member of the tractor associated with the device.

66. A device as claimed in claim 64, wherein between said distributing means there is arranged a coupling shaft which is linked through bevel pinions to rotary shafts of said distributing means, said coupling shaft being coupled through a bevel pinion transmission with said adjusting mechanism.

67. A device as claimed in claim 66, wherein said coupling shaft and said bevel pinions are accommodated in a closed gear box on which a further box is arranged for holding said adjusting mechanism.

68. A device as claimed in claim 66 comprising a driving shaft for driving said adjusting mechanism wherein said coupling shaft is connected with an auxiliary shaft associated with said adjusting mechanism, said auxiliary shaft being located beneath said driving shaft.

69. A device as claimed in claim 68, wherein said auxiliary shaft and said driving shaft have their center lines contained in a vertical plane passing through the longitudinal axis of the device.

70. A device as claimed in claim 66, wherein said coupling shaft extends between two gear boxes each located below a said distributing means and a further gear box comprising said adjusting mechanism.

71. A device as claimed in claim 64 comprising a box containing said interchangeable pinions which has a cover provided with supports safeguarding said interchangeable pinions against movement along their axes of rotation.

72. A device as claimed in claim 71, wherein said cover is located near that side of the device from where material is spread during the operation of the device.

73. A device as claimed in claim 72, wherein said cover is inclined at an angle of about 60° to the horizontal plane.

74. A device as claimed in claim 1, wherein said hopper comprises a wall having an agitator coupled with a driving shaft being provided each said distributing member near said outlet ports.

75. A device as claimed in claim 74, wherein said agitator extends substantially in a plane parallel to said hopper's bottom.

76. A device as claimed in claim 74, wherein said agitator is formed by a plate having substantially the shape of a parallelogram as viewed perpendicularly to said hopper's bottom.

77. A device as claimed in claim 75, comprising a spoke arrangement wherein said agitator comprises an annular member fastened by said spoke arrangement to a hub fastened to said shaft of each said distributing means.

78. A device as claimed in claim 1, wherein the device comprises a frame having a rectangular upwardly extending framework located on one side of the device, the lower side of said framework having fastened to it a supporting beam to which are secured said distributing means and the driving means thereof.

79. A device as claimed in claim 78, wherein said framework is provided with supporting arms extending at right angles thereto and located at a higher level than said supporting beam, said supporting arms being located on opposite sides of said hopper and being connected with fastening strips of said hopper.

80. A device as claimed in claim 78, wherein said supporting beam has the shape of a V, viewed in plan, the ends of said supporting beam being secured to two upright beams of said framework.

81. A device as claimed in claim 80, wherein said supporting beam is provided on the side remote from the side of said framework, viewed in plan, with a drawhook for attaching a further implement.

82. A device as claimed in claim 79, wherein said supporting beam and said supporting arm are parallel to one another, viewed from a side.

83. A device as claimed in claim 82, wherein said supporting arms are arranged on said framework on upright beams thereof.

84. A device as claimed in claim 82, wherein said supporting arms are located approximately midway the height of said framework.

85. A device as claimed in claim 78, wherein said framework comprises two retangular-section, upright frame beams, between the ends of which are fastened circular-section frame beams.

86. A device as claimed in claim 78, wherein said upwardly extending framework is provided with said connection means comprising coupling members for attaching the device to the tractor's three-point lifting device.

87. A device as claimed in claim 85, wherein coupling members are arranged on said circular-section horizontal frame beams.

88. A device as claimed in claim 78, wherein at least one gear box comprising at least part of the drive of said distributing members is provided with fastening strips secured to said supporting beam.

89. A device for spreading granular and powdery materials comprising a frame, coupling means on said frame for supporting the device on the lifting arms of a tractor, a hopper for the material to be spread and at least two rotatable distributing means drivable in opposite rotational directions about upwardly extending rotary axes, said axes coinciding, with a vertically disposed plane which is perpendicular to the intended direction of operative travel of the device and being disposed equal distances from a further vertical plane coinciding with the centerline of the device and extending in its intended direction of operative travel, feeding means being provided between said hopper and said distributing means for feeding material from said hopper to each said distributing means, each said distributing means receiving material from said feeding means eccentrically with respect to its corresponding said rotary axis, each said distributing means spreading material received from its corresponding feeding means within a predetermined sector which extends over substantially equal distances on either side of said further vertical plane; said distributing means being driven in a manner cooperating with the disposition of said feeding means and so constructed and arranged that in operation each said distributing means spreads material across a said sector relative to its corresponding rotary axis which coincides throughout its greater extent with the sector across which the other said distributing means spreads material, each said distributing means having four blades which are angularly displaced 90° from each other on each said distributing means, said blades on one said distributing means being displaced by 45° relative to the instantaneous angular position of the blades on the other said distributing means whereby in operation of the device material ejected from one said distributing means is unlikely to collide with material ejected from the other said distributing means.

90. A device for spreading granular and powdery materials which comprises: a frame; coupling means for attaching said frame to the lifting device of a tractor included in said frame; material storage means for carrying material to be spread comprising a pair of side-by-side funnels supported in said frame; a pair of side-by-side rotatable distributing means, one said distribution means under each said funnel; rotating means for performing the function of rotating each said distributing means in opposite directions about upwardly extending axes of rotation; feeding means disposed at the bottom of each said funnel for performing the function of receiving material from its respective said funnel and delivering same eccentrically to each said distributing means with respect to its corresponding axis of said axes of rotation; each said distributing means comprising at least one ejection means for ejecting said materials, said ejection means of one said distributing means being angularly offset as seen in plan relative to the ejection means on the other said distributing means; the place of delivery of material from the corresponding said feeding means on each said distributing means being so located that said material ejected from said ejection means of each said distributing means is spread within a predetermined sector which substantially coincides with the predetermined sector within which said ejection means of the other said distributing means spreads material, whereby said ejection means of said pair of distributing means perform the function of ejecting material in an alternating sequence to within substantially the same sector.

91. A device for spreading granular and powdery materials which comprises: a frame coupling means for attaching said frame to the lifting device of a tractor; material storage means for carrying materials to be stored; a pair of side-by-side rotatable distributing means; each said distributing means comprising ejecting means for ejecting material therefrom; rotating means performing the function of rotating each said distributing means in relatively opposite directions about substantially vertical axes of rotation; feeding means receiving material from said material storage means and delivering same eccentrically to each said distributing means with respect to its corresponding axis of said axes of rotation; each said distributing means receiving material from said feeding means and ejecting said material by said ejecting means to spread said material within predetermined substantially coinciding sectors; said ejecting means performing the function of alternatively ejecting material respectively first from one said distributing means and next from the other in a continuing sequence whereby the likelihood of said material ejected from one said distributing means colliding with material ejected from the other said distributing means is practically nil.

92. A device in accordance with claim 91, wherein said ejecting means comprise a plurality of blades on each said distributing means which extend outwardly in each said distributing means relative to its respective axis of rotation, said blades of one said distributing means being angularly offset relative to said blades of the other said distributing means.

93. A device in accordance with claim 92, wherein each said distributing means has four blades angularly displaced relative to each other by 90° and said offset between said four blades on each said distributing means relative to said four blades on the other said distributing means is 45°.

94. A device for spreading granular and powdery material which comprises: material storage means for carrying material to be spread; mounting means for mounting the device on a tractor; a pair of rotatable distributing means; rotating means for performing the function of rotating each said distributing means, intermeshing gears included in said rotating means, means provided for interchanging said gears mounted on the side of the device opposite said mounting means, said means for providing the interchanging of said gears performing the function of providing for selective replacing of gears in said rotating means selectively to change the speed of rotation of said distributing means; feeding means receiving material from said material storage means and delivering same to each said distributing means; each said distributing means comprising ejecting means ejecting material received from said feeding means alternatively from one distributing means and then the other in a continuing sequence to substantially the same section, the distance said material is ejected by said distributing means being increased for the same said material as the speed of rotation of said distributing means is increased by said selective replacement of said gears.

95. A device for spreading granular and powdery material which comprises: a hopper for carrying material to be spread; a framework comprising mounting and support means for said hopper; a pair of side-by-side rotatable distributing means under said hopper; rotating means for rotating each said distributing means in opposite directions about upwardly extending axes of rotation; feeding means for receiving material from said hopper means and delivering said material eccentrically to each distributing means with respect to its corresponding axis of said axes of rotation; each said distributing means comprising ejecting means ejecting material received from said feeding means to spread said material within a predetermined sector which substantially coincides with a like predetermined sector within which the other said distributing means spreads material, said ejecting means alternating the ejection of material first from one said distributing means and then from the other said distributing means in a continuing sequence into said coinciding sectors, said coinciding sectors being disposed to the rear relative to the device; said mounting and support means comprising two forward laterally spaced parallel vertical beams, two vertically spaced parallel horizontal beams rigidly connecting said vertical beams to each other to form a substantially coplanar upstanding rectangle, means on the upper of said horizontal beams for receiving said hopper means on its aft side and for connection to an upper rod of a three-point lifting device of a tractor on its forward side, a pair of means in the lower of said horizontal beams for connecting to two lower rods of a three point lifting device of a tractor, a horizontal substantially V-shaped beam extending from said two laterally spaced vertical beams from proximate the connection thereto of the lower of said horizontal beams to the rear, there being no obstruction between said distributing means and their respective predetermined coinciding sectors wherein material is spread.

96. A device for spreading granular and powdery materials comprising a frame, coupling means in said frame adapted to mount said frame on the lifting device of a tractor, a hopper carried by said frame for the material to be spread and two rotatable distributing means which rotate in opposite directions about upwardly extending axes, feeding means provided between said hopper and each said distributing means for feeding material from said hopper to each said distributing means, said distributing means each receiving material from said feeding means eccentrically with respect to its corresponding said rotary axis and comprising ejecting means spreading material so received in a continuing alternating sequence first from one said distributing means and then from the other distributing means to within predetermined sectors which substantially coincide, an outlet in said hopper, said feeding means comprising a dosing mechanism for metering the amount of material supplied per unit time from said hopper to each said distributing means located near said outlet, said dosing mechanism for each said distributing means being formed by a dosing plate having at least one outlet which is movable with respect to said outlet of said hopper whereby said one outlet can optionally be opened or closed to a greater or lesser extent, a setting mechanism for each said dosing plate, said setting mechanism including a setting arm and having a rim, said setting arm being pivoted to said rim, said setting arms joining said dosing plates with said setting mechanism.

97. A device as claimed in claim 96, wherein said setting mechanism includes a setting shaft and each said setting arm is pivotally coupled with an arm member rigidly secured to said setting shaft.

98. A device as claimed in claim 97, wherein said setting shaft is journalled in supports fixed to said hopper.

99. A device as claimed in claim 98, wherein said setting shaft is disposed at right angles to the intended direction of operative travel of the device.

100. A device as claimed in claim 98 including a control mechanism for controlling the amount of material being spread and a coupling arm connected thereto, wherein said setting shaft is provided with said control mechanism, said control mechanism adapted to be actuated by the operator in a tractor associated with the device.

101. A device as claimed in claim 100 wherein said control mechanism is supported by a bridge support arranged between said distributing means as seen in plan.

102. A device as claimed in claim 101 wherein said bridge support is located in a plane passing through two said rotary axes of said distributing means.

103. A device as claimed in claim 96 wherein said setting shaft is provided with a stop arm adapted to be moved along a guide plate provided with a fixed stop with which said arm cooperates.

104. A device for spreading granular and powdery materials comprising a frame, coupling means on said frame for supporting the device on the lifting arms of a tractor, a hopper for the material to be spread and at least two rotatable distributing means drivable in opposite rotational directions about upwardly extending rotaty axes, said axes coinciding with a vertically disposed plane which is perpendicular to the intended direction of operative travel of the device and being disposed equal distances from a further vertical plane coinciding with the centerline of the device and extending in its intended direction of operative travel, feeding means being provided between said hopper and said distributing means for feeding material from said hopper to each said distributing means, each said distributing means receiving material from said feeding means eccentrically with respect to its corresponding said rotary axis, each said distributing means spreading material received from its corresponding feeding means with a predetermined sector which extends over substantially equal distances on either side of said further vertical plane; said distributing means being driven in a manner cooperating with the disposition of said feeding means and so constructed and arranged that in operation each said distributing means spreads material across a said sector relative to its corresponding rotary axis which coincides throughout its greater extent with the sector across which the other said disbuting means spreads material, each said distributing means having four blades which are angularly displaced 90° from each other on each said distributing means, said blades on one said distributing means being displaced by 45° relative to the instantaneous angular position of the blades on the other said distributing means whereby in operation of the device material ejected from one said distributing means is unlikely to collide with material ejected from the other said distributing means.

105. A spreader for spreading granular and/or powdery material comprising at least two distribution members which are drivable about rotary axes, feeding means for performing the function of supplying material to said distribution members so each of said two distribution members receives material at a location offset from its respective rotary axis, said two distribution members being drivable to rotate in opposite senses, said feeding means being constructed and arranged so as to feed material to said distribution members during operation in such a way that the area covered by the respective said distribution members substantially coincide with one another, transmission means coupling said two distribution members with one another and performing the function of synchronizing the relative position of said two distribution members relative to one another about their rotary axes, each of the distribution members comprising at least one ejecting member, each said ejecting member of the two distribution members being offset relative to the other to move at different times along a relative position between them where said two distribution members are nearest to each other.

106. A spreader for spreading granular and/or powdery material comprising two side-by-side rotatable distribution members, means for driving said distribution members about upwardly extending axes and in relatively opposite directions whereby portions of said distribution members nearest one another move in directions generally opposite the directions in which material is broadcast from said distribution members during operation, feeding means positioned to supply material to said distribution members whereby each of the two distribution members receives material at a location laterally offset from the respective rotary axis of that distribution member, each said distribution member having at least two ejection means extending outwardly from its upwardly extending axis of rotation, the ejection means on each said distribution member being separated by equal degrees of arc relative to its respective upwardly extending axis of rotation, said ejection means on one said distribution member passing through a plane containing both said axes of rotation alternately relative to the ejection means on the other said distribution member, means adjusting said feeding means simultaneously to feed a selected amount of material to each of said distribution members and means for controlling simultaneously the revolutionary speed of said distribution members and to define the size of the areas treated by the respective distribution members, said feeding means, said distribution members and said adjusting means so constructed and arranged that said treated areas are each approximately centered behind their respective distribution member and are substantially coinciding with one another throughout their widths.

* * * * *